US 8,542,088 B2

(12) United States Patent
Dagtekin

(10) Patent No.: US 8,542,088 B2
(45) Date of Patent: Sep. 24, 2013

(54) METHOD AND CIRCUIT ARRANGEMENT FOR MONITORING DEVICES ACTIVATED BY ELECTRICAL PULSES

(75) Inventor: Nusret Dagtekin, Vaihingen (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 244 days.

(21) Appl. No.: 12/734,915

(22) PCT Filed: Nov. 21, 2008

(86) PCT No.: PCT/EP2008/009847
§ 371 (c)(1),
(2), (4) Date: Jul. 22, 2010

(87) PCT Pub. No.: WO2009/071184
PCT Pub. Date: Jun. 11, 2009

(65) Prior Publication Data
US 2010/0283574 A1    Nov. 11, 2010

(30) Foreign Application Priority Data

Dec. 3, 2007 (DE) .......................... 10 2007 057 990

(51) Int. Cl.
*G05B 23/02* (2006.01)
(52) U.S. Cl.
USPC ........................................ 340/3.43; 377/118
(58) Field of Classification Search
USPC ...................................................... 340/3.55
See application file for complete search history.

(56) References Cited

U.S. PATENT DOCUMENTS

| 3,644,720 | A | * | 2/1972 | Falk ............................. 318/603 |
| 5,260,608 | A | * | 11/1993 | Marbot ......................... 327/261 |
| 5,316,263 | A | * | 5/1994 | Mino ........................ 251/129.05 |
| 5,691,611 | A | * | 11/1997 | Kojima et al. ............ 318/400.04 |
| 6,441,580 | B2 | * | 8/2002 | Marcinkiewicz ............. 318/727 |
| 7,514,891 | B2 | | 4/2009 | Sader |
| 2004/0009074 | A1 | * | 1/2004 | Dodson, III .................... 417/22 |

FOREIGN PATENT DOCUMENTS

| DE | 29 38 344 | 4/1981 |
| DE | 39 25 418 | 2/1991 |
| DE | 42 02 601 | 8/1993 |
| DE | 42 15 075 | 9/1993 |
| DE | 197 58 101 | 7/1999 |
| DE | 101 24 109 | 12/2002 |
| DE | 103 23 908 | 12/2004 |
| EP | 0 553 451 | 8/1993 |
| EP | 0 558 813 | 9/1997 |
| GB | 2 265 228 | 9/1993 |

OTHER PUBLICATIONS

Texas Instruments Synchronous 4-Bit Up/Down Counters (Dual Clock with Clear), SN 74192 Data Sheet, Mar. 31, 1988, 22 pages.*

(Continued)

*Primary Examiner* — Daniel Wu
*Assistant Examiner* — Frederick Ott
(74) *Attorney, Agent, or Firm* — Kenyon & Kenyon LLP

(57) ABSTRACT

A method for monitoring devices which are activated by electrical pulses, characterized in that first pulses which are transmitted to the device are counted, in that second pulses which are received by the device are counted, and in that the numbers of first and second pulses are compared with one another.

6 Claims, 2 Drawing Sheets

(56) References Cited

OTHER PUBLICATIONS

European Patent Office, International Preliminary Report on Patentability and Written Opinion, Jun. 17, 2010, from International Patent Application No. PCT/EP2008/009847, filed on Nov. 21, 2008.

European Patent Office, Translation of International Preliminary Report on Patentability and Written Opinion, Jul. 15, 2010, from International Patent Application No. PCT/EP2008/009847, filed on Nov. 21, 2008.

* cited by examiner

METHOD AND CIRCUIT ARRANGEMENT FOR MONITORING DEVICES ACTIVATED BY ELECTRICAL PULSES

FIELD OF THE INVENTION

The present invention relates to a method and circuit arrangement for monitoring devices which are activated by electrical pulses.

BACKGROUND INFORMATION

In motor vehicle engineering, many devices, in particular valves such as brake control valves, anti-lock brake valves, trailer brake valves and the like, are activated by electrical pulses and, in particular, pulse-width-modulated signals (referred to below as PWM signals). The control devices which are used for this purpose usually contain a program-controlled microprocessor which activates the corresponding valves via an output stage (driver circuit).

In safety-critical applications, such as in brake valves of motor vehicles, it is necessary to detect as quickly as possible faults which occur, such as failure of the driver circuit, line breaks, short circuits, grounding faults and similar. For this purpose, costly checking circuits are known which monitor and signal possible faults.

For example DE 42 15 075 C2 discusses a method for activating an electrical component with at least one microcomputer with two control inputs. Signals are transmitted unidirectionally on a first control line and bidirectionally on the second control line. The second control line is also used here as fault feedback line, and the bidirectional connection is capable of differentiating two different LOW levels, with corresponding levels being compared using a comparator and conclusions about a fault state being drawn therefrom.

Further monitoring circuits are discussed in German patent documents DE 197 58 101 C2, DE 42 02 601 A1, and DE 29 38 344 A1.

SUMMARY OF THE INVENTION

An object of the exemplary embodiments and/or exemplary methods of the present invention is to improve a method and a device of the type mentioned at the beginning to the effect that the most reliable possible monitoring of the activation of a device which is activated by electrical pulses is possible with low expenditure in terms of circuitry.

This object is achieved for the method described herein, and for the circuit arrangement described herein.

Advantageous refinements and developments of the exemplary embodiments and/or exemplary methods of the present invention also described herein.

One aspect of the exemplary embodiments and/or exemplary methods of the present invention is to evaluate the feedback of an output stage using a counter. The control device therefore transmits first electrical pulses to the output stage which activates a corresponding device, such as for example a solenoid valve, with these pulses. Pulse-width-modulated pulses are usually used here. The output of the output stage is tapped and the pulses which are tapped in this way are fed back and also counted. By comparison of the number of the first pulses and the number of the second pulses, a fast and reliable indication is obtained as to whether all the activation pulses which are transmitted to the output stage were also passed on to the device which is to be activated.

In a particular way, an upward/downward counter may be used, to whose upward counting input some of the pulses are applied and to whose downward counting input the other pulses are applied. In the fault-free state, the counter reading of this upward/downward counter is equal to zero, wherein it is possible to predetermine a tolerance band above which counter reading a fault is to be signaled.

There may be provision that the counter is reset to the counter reading zero at periodic intervals.

The corresponding circuit arrangement with a control device and a driver circuit has a feedback circuit which is connected to the output of the driver circuit and is connected to a counting input of a counter. The feedback circuit is constructed in a particularly simple way in the form of a voltage divider.

In the control device, the counter reading of the counter may be interrogated and checked by a microprocessor at regular intervals to determine whether the counter reading has a value which is to be expected. This value is dependent on how high the activation frequency is and what type of counter is used.

In the text which follows, the exemplary embodiments and/or exemplary methods of the present invention will be explained in more detail on the basis of two exemplary embodiments and with reference to the drawing.

DETAILED DESCRIPTION

Figure 1:
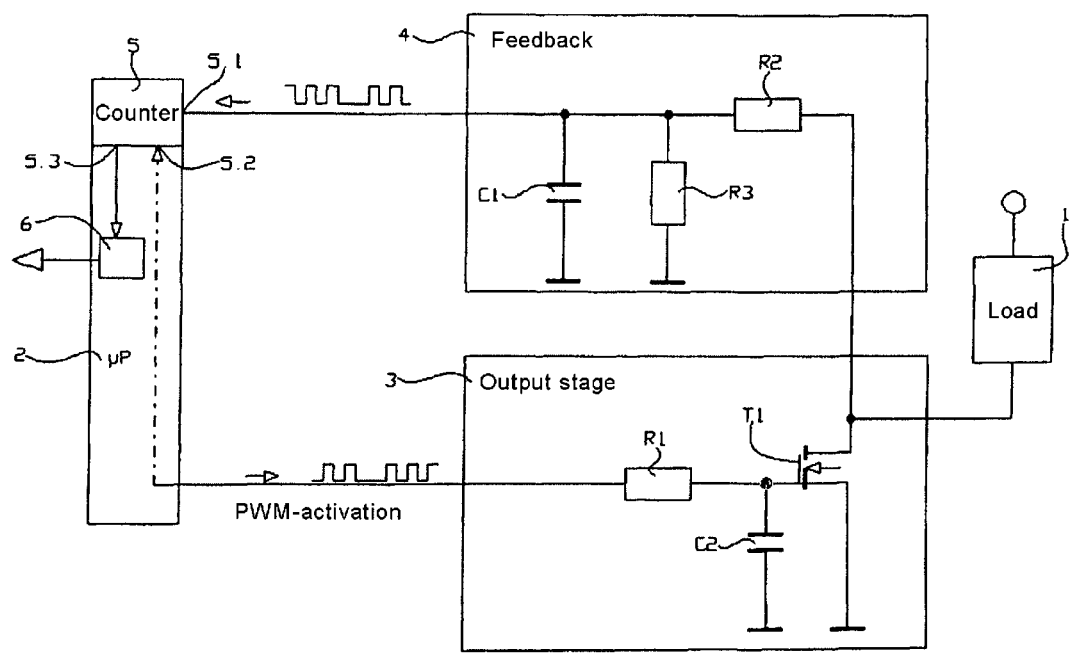
FIG. 1 shows a basic circuit diagram of a first exemplary embodiment according to the present invention.

The circuit arrangement according to the present invention has as device a load 1 which is to be activated and which is, for example, a solenoid valve of a brake system. This load 1 is activated by PWM signals. For this purpose, a control device 2 is provided with a microprocessor which supplies corresponding PWM signals to the load 1 via an output stage 3. The output stage 3 has an RC element with a resistor R1 and a capacitor C2 as well as a transistor T1 to whose output the load 1 is connected. A feedback circuit 4, which contains a voltage divider with resistors R2 and R3 as well as a capacitor C1, is connected to this output, wherein one output of the feedback circuit 4 is connected to a counting input 5.1 of a counter 5.

In addition, the counter 5 has here a second counting input 5.2 which receives internally in the control device 2 the PWM signals which are fed to the output stage 3. One of the counting inputs 5.1 or 5.2 causes the counter to count upward, while the other counting input 5.2 or 5.1 brings about downward counting. As a result, for example the pulses which arrive at the counting input 5.2 and are therefore transmitted simultaneously to the output stage 3 are counted upward, and the pulses which arrive from the feedback circuit are counted downward at the counting input 5.1. If all the pulses which are transmitted to the output stage 3 also pass back to the counting input 5.1 via the feedback circuit 4, the counter reading of the counter 5 is equal to zero and is output at the counter output 5.3. An interrogation circuit 6 is connected to this output 5.3 and signals when the interrogated counter reading has exceeded a specific predefined value.

Figure 2:
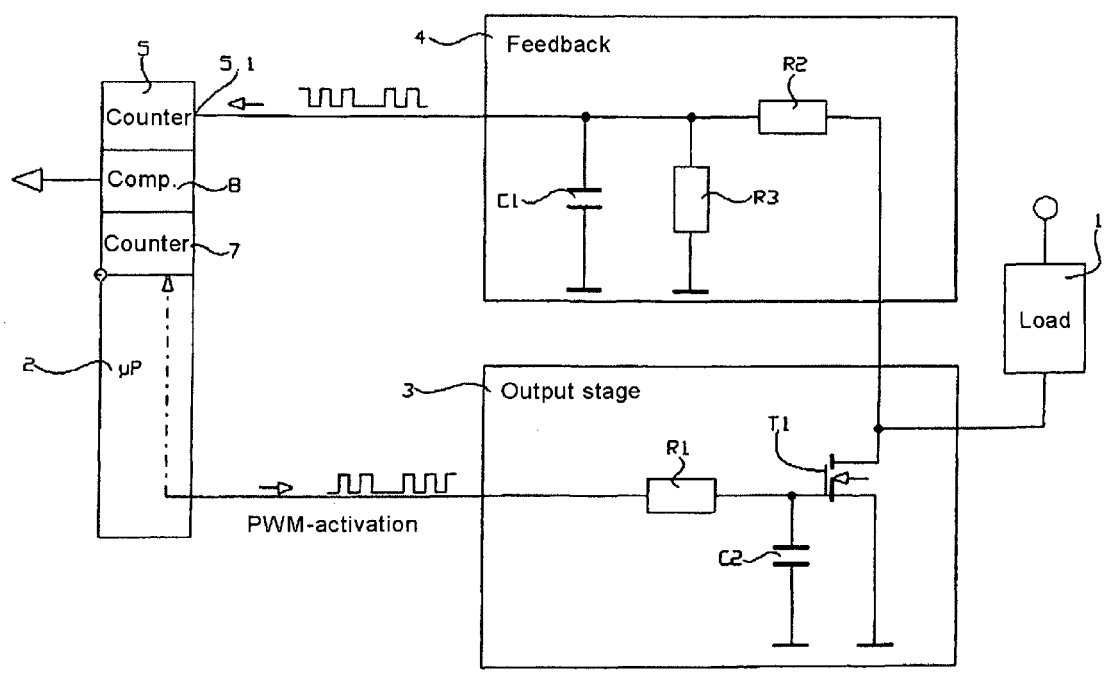
FIG. 2 shows a basic circuit diagram of a second exemplary embodiment of the present invention.

The exemplary embodiment in FIG. 2 differs from that in FIG. 1 only in the type of counters. Two counters 5 and 7 are provided here. The first counter 5 is connected by its counting input 5.2 to the feedback circuit 4, while the PWM pulses which are transmitted to the output stage 3 are applied to the second counter 7 internally in the control device 2. Both counters 5 and 7 are compared with a comparator 8 which compares the counting contents of the two counters 5 and 7 at regular intervals. If the deviation between the counter readings of counters 5 and 7 is above a predefined limiting value, the comparator 8 also signals a fault.

In both exemplary embodiments it is advantageous to reset the counter reading of the counters 5 or 5 and 7 to zero at predefined time intervals.

In the case of the faults which are customary in motor vehicles, for example a line break, a short circuit, soldering through of the power transistor T1 in the output stage 3 or the like, the PWM pulses which are transmitted to the output stage 3 will no longer appear at the output of the output stage 3 or will appear in a highly falsified form, with the result that faults can be quickly and easily detected. In this context it is, of course, expedient to set, at the counting input 5.1, corresponding high and low levels at which a counting process is triggered. In order to avoid transit time errors of the counters and in order to avoid unnecessarily frequent fault messages owing to individual extraneous interference pulses, there is provision in both exemplary embodiments that a fault message is not output until the counter reading or the counter readings is/are outside a predetermined tolerance band.

The invention claimed is:

1. A method for a monitoring device, which is activated by electrical pulses, the method comprising:
   counting first pulses that are transmitted from a control arrangement to the monitoring device by an output of an output stage of a control arrangement, wherein the output of the output stage is connected to the monitoring device which is to be activated, and wherein a feedback arrangement is connected to the control arrangement and to the output of the output stage;
   counting, using the control arrangement, second pulses, which are received via the feedback arrangement, that are also received by the monitoring device from the output of the output stage; and
   comparing, using the control arrangement, the numbers of first pulses and second pulses with one another;
   wherein counting is performed by a counter of the control arrangement, and wherein the counter is an upward/downward counter, to the upward counting input of which the first pulses are fed, and to the downward counting input of which the second pulses are fed,
   wherein a fault message is output only if a counter reading or counter readings is/are outside a predetermined tolerance band, and
   wherein the counter is reset to zero in predefined time intervals.

2. The method of claim 1, wherein the comparing is performed by an upward/downward counter which counts the first pulses or the second pulses in an upward direction and counts the correspondingly different second pulses or first pulses in a downward direction.

3. A circuit arrangement for a monitoring device, which is activated by electrical pulses, comprising:
   a control device to transmit first pulses to an output stage, whose output is connected to a monitoring device which is to be activated;
   a feedback circuit connected to the output of the output stage, which is connected to the input of the monitoring device, and connected to a counting input of a counter, wherein the pulses which are transmitted by the control device to the output stage are counted in the counter or a further counter; and
   a comparing device to compare the number of the pulses transmitted to the output stage and the number of the pulses transmitted by the feedback circuit
   wherein the counter or the further counter are components of the control device, and wherein the counter is an upward/downward counter, to the upward counting input of which the first pulses are fed, and to the downward counting input of which the second pulses are fed,
   wherein a fault message is output only if the counter reading or the counter readings is/are outside a predetermined tolerance band, and
   wherein the counter or the further counter are reset to zero in predefined time intervals.

4. The circuit arrangement of claim 3, wherein two counters are provided to the counting inputs of which the first pulses or second pulses are respectively fed, and in that the counting outputs of the two counters are compared with one another in a comparator.

5. The circuit arrangement of claim 3, wherein the counting input which is connected to the feedback circuit responds to preset levels.

6. The circuit arrangement of claim 3, wherein the comparing is performed by an upward/downward counter which counts the first pulses or the second pulses in an upward direction and counts the correspondingly different second pulses or first pulses in a downward direction.

* * * * *

UNITED STATES PATENT AND TRADEMARK OFFICE
CERTIFICATE OF CORRECTION

PATENT NO.       : 8,542,088 B2                         Page 1 of 1
APPLICATION NO.  : 12/734915
DATED            : September 24, 2013
INVENTOR(S)      : Nusret Dagtekin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 392 days.

Signed and Sealed this

Fifteenth Day of September, 2015

Michelle K. Lee
*Director of the United States Patent and Trademark Office*